(12) United States Patent
Kendig

(10) Patent No.: US 7,459,102 B2
(45) Date of Patent: *Dec. 2, 2008

(54) SUPRAMOLECULAR OXO-ANION CORROSION INHIBITORS

(75) Inventor: Martin W Kendig, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 536 days.

This patent is subject to a terminal disclaimer.

(21) Appl. No.: 10/803,249

(22) Filed: Mar. 18, 2004

(65) Prior Publication Data

US 2004/0175587 A1    Sep. 9, 2004

Related U.S. Application Data

(63) Continuation of application No. 09/915,248, filed on Jul. 25, 2001, now Pat. No. 6,716,370.

(51) Int. Cl.
  *C23F 11/08* (2006.01)
  *C23F 11/00* (2006.01)
  *C09K 15/02* (2006.01)
  *B05D 1/00* (2006.01)
  *B05D 5/00* (2006.01)

(52) U.S. Cl. ............... 252/387; 252/389.2; 252/389.54; 252/397; 252/400.2; 252/400.54; 106/14.05; 106/14.12; 106/14.21; 427/331; 427/343; 427/344; 427/337; 427/421.1; 427/428.01; 205/203

(58) Field of Classification Search ............... 252/387; 427/331, 337, 343, 344
See application file for complete search history.

(56) References Cited

U.S. PATENT DOCUMENTS

| | | | |
|---|---|---|---|
| 3,969,127 A | | 7/1976 | Robitaille et al. |
| 4,310,390 A | | 1/1982 | Bradley et al. |
| 4,313,837 A | | 2/1982 | Vukasovich et al. |
| 4,459,155 A | | 7/1984 | Cayless |
| 5,002,697 A | * | 3/1991 | Crucil et al. ........... 252/389.23 |
| 5,158,663 A | | 10/1992 | Yahalom |
| 5,205,922 A | | 4/1993 | Ahearn, Jr. et al. |
| 5,322,560 A | | 6/1994 | DePue et al. |
| 5,330,635 A | | 7/1994 | Floyd, Jr. |
| 5,382,347 A | | 1/1995 | Yahalom |

(Continued)

*Primary Examiner*—Joseph D Anthony
(74) *Attorney, Agent, or Firm*—Harness, Dickey & Pierce, P.L.C.

(57) ABSTRACT

A corrosion inhibitor that includes several oxo-anion compositions useful for preventing the propagation of pit corrosion on aluminum and aluminum alloys. The oxo-anion compositions may include soluble polymeric oxidic acids comprising combinations of molybdenum, phosphorous, tungsten, and silicon. These compositions are useful as corrosion inhibitors in high-moisture, corrosive environments, such as radiators and cooling systems. For low-moisture environments, these oxo-anion compositions can be reacted with a counter-ion, such as various metals, including, but not limited to the rear earth metals, to form a soluble salt. The salt can then be adsorbed onto a carrier, such as paint pigments, which can then be applied to the surfaces of aluminum and aluminum alloys. These surface adsorbates then become sparingly soluble and are gradually released over time in the presence of an aqueous corrosive agent so as to prevent propagation of pit corrosion. The various compositions can be formed as a coating or absorbed in to a substrate to reduce or inhibit a corrosion of the substrate.

23 Claims, 4 Drawing Sheets

U.S. PATENT DOCUMENTS

| | | | |
|---|---|---|---|
| 5,449,415 A * | 9/1995 | Dolan | 148/259 |
| 5,585,189 A | 12/1996 | Inoue et al. | |
| 5,759,244 A * | 6/1998 | Tomlinson | 106/14.14 |
| 5,863,621 A | 1/1999 | Dearnaley et al. | |
| 5,964,928 A | 10/1999 | Tomlinson | |
| 6,024,892 A * | 2/2000 | Verma et al. | 252/194 |
| 6,361,622 B1 * | 3/2002 | McCormick et al. | 148/247 |
| 6,500,276 B1 * | 12/2002 | Minevski et al. | 148/273 |
| 6,503,420 B1 * | 1/2003 | Verma | 252/194 |

* cited by examiner

SUPRAMOLECULAR OXO-ANION CORROSION INHIBITORS

This application is a continuation of U.S. patent application Ser. No. 09/915,248 filed on Jul. 25, 2001 now U.S. Pat. No. 6,716,370. The disclosure of the above application is incorporated herein by reference.

TECHNICAL FIELD

The present invention relates generally to corrosion inhibitors, and more particularly to new and improved corrosion inhibitors based on several supramolecular oxo-anion compositions.

BACKGROUND OF THE INVENTION

The use of relatively lightweight, anodized aluminum and aluminum alloys in the aerospace industry has enabled the production of lighter and less expensive to manufacture aerospace vehicles. Anodized aluminum and aluminum alloys are formed by the coating of a protective, passive layer of aluminum oxide on a surface layer thereof, typically by an anodic process in a suitable electrolyte such as chromic or sulfuric acid. However, one significant and quite common problem that has been encountered by the aerospace industry with respect to anodized aluminum and aluminum alloys is a type of corrosion generally referred to as pit corrosion.

Pit corrosion is generally defined as a localized form of corrosion, i.e., the bulk of the affected surface remains substantially unattacked. Typically, pit corrosion occurs when the affected surface is exposed to a corrosive environment, such as relatively high moisture levels, especially those containing dissolved chemical species, such as halides.

Pitting is often found in situations where resistance against general corrosion is conferred by passive surface films (e.g., anodized surfaces). Localized pitting attack is found where these passive films have broken down. Within the pits, an extremely corrosive micro-environment tends to be established, which may bear little resemblance to the bulk corrosive environment. The pH within the pits tends to be lowered significantly, together with an increase in chloride ion concentration, as a result of the electrochemical pitting mechanism reactions in such systems. Detection and monitoring of pitting corrosion is extremely difficult. Eventually, pitting can lead to mechanical failure of the affected component, which can have catastrophic effects, especially in an aerospace vehicle setting.

In order to protect the anodized aluminum alloys from corrosion, especially pit corrosion, it was common practice in the aerospace industry either paint the surface or to seal the surface thereof by applying oxo-anions of hexavalent chromium, also commonly referred to as chromium(VI). Additionally, sparingly soluble chromium(VI) compounds have also been dispersed in a resin film in order to provide a corrosion resistant paint primer for aluminum and aluminum alloy components. Both of these methods have been widely used in the manufacture of aerospace vehicles and components thereof.

Other approaches to overcoming this problem have included high temperature water sealing and nickel acetate sealing of anodized aluminum, although the results have not been entirely satisfactory.

It is generally believed that the role played by chromium (VI) in corrosion protection is that it renders protective coatings active by releasing corrosion inhibiting chemical species upon exposure to an aqueous environment. These species then migrate to defects (e.g., pits) in the protective coatings where they inhibit further corrosion. It is also generally believed that these chromium(VI) species lower the zeta potential upon adsorption on metal oxides, such as anodized aluminum and alloys thereof. This adsorption is considered to discourage subsequent adsorption of corrosive halide anions, such as chloride anions.

Unfortunately, chromium(VI) is quite hazardous and is currently believed to be a potential human carcinogen. As such, it's continued long-term use in the aerospace industry as a corrosion inhibiting agent is in extreme doubt.

Therefore, there exists a need for an alternative corrosion inhibitor for aerospace components comprised of either painted or anodized aluminum and aluminum alloys, wherein the corrosion inhibitor is inexpensively and easily manufactured, is non-hazardous to handle, is easily applied, and is effective against corrosion, especially pit corrosion.

Furthermore, this alternative corrosion inhibitor should: (1) adsorb onto aluminum oxide coatings so as to lower the zeta potential of the oxide; (2) remain immobilized in the protective coating (i.e., paint or oxide) until needed to inhibit corrosion; (3) release corrosion inhibiting species upon exposure to a corrosive aqueous environment; and (4) reinforce the growth of a protective aluminum oxide film, or inhibit cathodic reduction of oxygen on cathodically active sites such as secondary phase compounds.

SUMMARY OF THE INVENTION

It is therefore, according to various embodiments of this invention to provide a new and improved corrosion inhibitor.

According to various embodiments of this invention to provide a new and improved corrosion inhibitor for aluminum and aluminum alloys.

According to various embodiments of this invention to provide a new and improved corrosion inhibitor for painted and/or anodized aluminum and aluminum alloys.

According to various embodiments of this invention to provide a new and improved corrosion inhibitor for painted and/or anodized aluminum and aluminum alloys, wherein the corrosion inhibitor is comprised of supramolecular oxo-anions.

According to various embodiments of this invention to provide a new and improved corrosion inhibitor for painted and/or anodized aluminum and aluminum alloys, wherein the corrosion inhibitor is comprised of supramolecular oxo-anions of molybdenum, phosphorous, tungsten, silicon, and combinations thereof.

According to various embodiments of this invention to provide a new and improved corrosion inhibitor for painted and/or anodized aluminum and aluminum alloys, wherein the corrosion inhibitor is comprised of metallic salts of the supramolecular oxo-anions of molybdenum, phosphorous, tungsten, silicon, and combinations thereof.

According to various embodiments of this invention to provide a new and improved corrosion inhibitor for painted and/or anodized aluminum alloys, wherein the corrosion inhibitor is comprised of rare earth metallic salts of the supramolecular oxo-anions of molybdenum, phosphorous, tungsten, silicon, and combination thereof.

According to various embodiments of this invention to provide a new and improved corrosion inhibitor for painted and/or anodized aluminum and aluminum alloys, wherein the corrosion inhibitor is comprised of lanthanide series salts of the supramolecular oxo-anions of molybdenum, phosphorous, tungsten, silicon, and combinations thereof.

In accordance with a first embodiment of the present invention, a corrosion inhibitor is provided, comprising an oxo-anion having the general formula $(H_NA_NO_N)_N(A_NO_N)_{N(H2O)_N}$; wherein H is hydrogen, O is oxygen, N is an integer equal to 1 or higher, and A is selected from the group consisting of molybdenum, phosphorous, tungsten, silicon, and combination thereof; wherein the oxo-anion is capable of substantially inhibiting the propagation of pit corrosion on the surface of a coated metallic substrate.

In accordance with a second embodiment of the present invention, a corrosion inhibitor is provided, comprising a salt having the general formula $(D_N)(((H_NA_NO_N)_N(A_NO_N)_N(H_2O)_N)_N)$; wherein D is a metal cation, H is hydrogen, O is oxygen, N is an integer equal to 1 or higher, and A is selected from the group consisting of molybdenum, phosphorous, tungsten, silicon, and combination thereof; wherein the salt is capable of substantially inhibiting the propagation of pit corrosion on the surface of a coated metallic substrate.

In accordance with a third embodiment of the present invention, a method is provided for substantially inhibiting the propagation of pit corrosion on the surface of a coated metallic substrate, comprising providing an oxo-anion having the general formula $(H_NA_NO_N)_N(A_NO_N)_N(H_2O)_N$; wherein H is hydrogen, O is oxygen, N is an integer equal to 1 or higher, and A is selected from the group consisting of molybdenum, phosphorous, tungsten, silicon, and combination thereof; and applying a sufficient amount of the oxo-anion to the surface of the coated metallic substrate.

These and other embodiments, advantages and novel features of the present invention will become apparent from the following detailed description of the invention when considered in conjunction with the accompanying drawings.

BRIEF DESCRIPTION OF THE DRAWINGS

The present invention will become more fully understood from the detailed description and the accompanying drawing, wherein.

The same elements or parts throughout the figures are designated by the same reference of characters.

DETAILED DESCRIPTION OF THE PREFERRED EMBODIMENTS

In accordance with one embodiment of the present invention, oxo-anions are employed for their corrosion inhibition properties, especially the ability to prevent the propagation of pit corrosion in coated aluminum and aluminum alloys, such as anodized and painted aluminum and aluminum alloys. Oxo-anions are generally defined as oxygen-containing species having a net negative ionic charge.

Of particular interest are the oxo-anions of molybdenum, phosphorous, tungsten, silicon, and combination thereof. Typically, these oxo-anions would have the general formula $A_NO_N$, wherein A is molybdenum, phosphorous, tungsten, and/or silicon, O is oxygen, and N is an integer equal to 1 or greater.

Figure 1A:
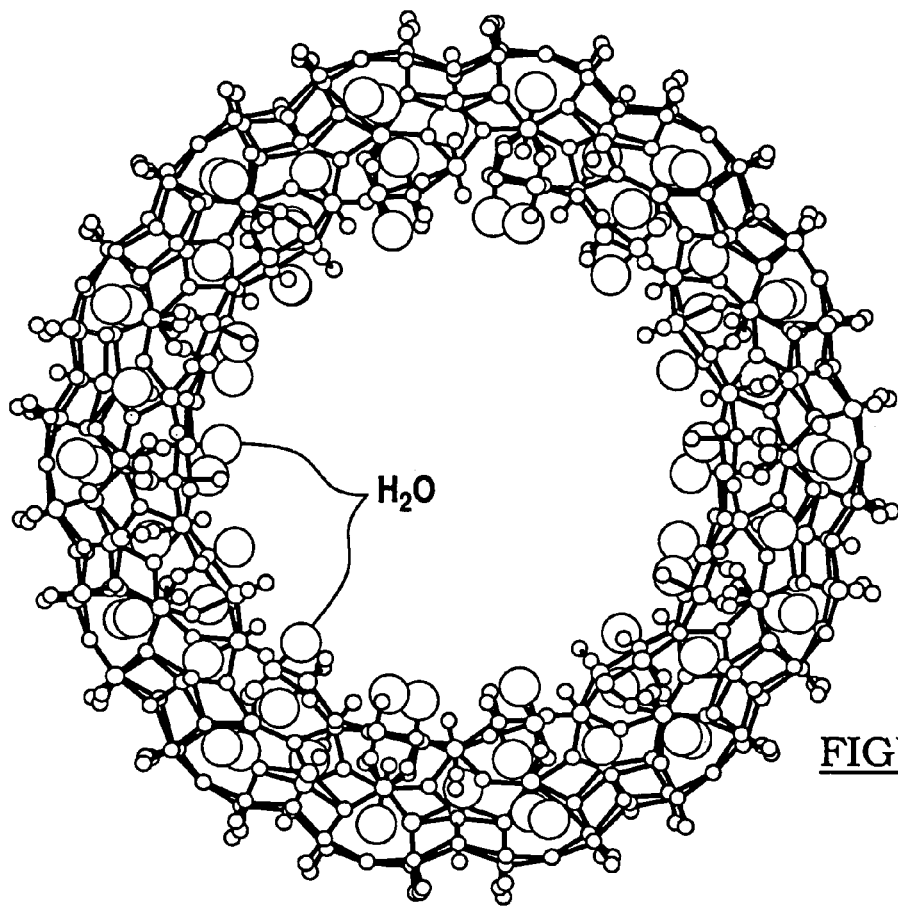
FIG. 1a is a top view of an exemplary oxo-anion in a ring-like configuration, in accordance with one embodiment of the present invention.
Figure 1B:
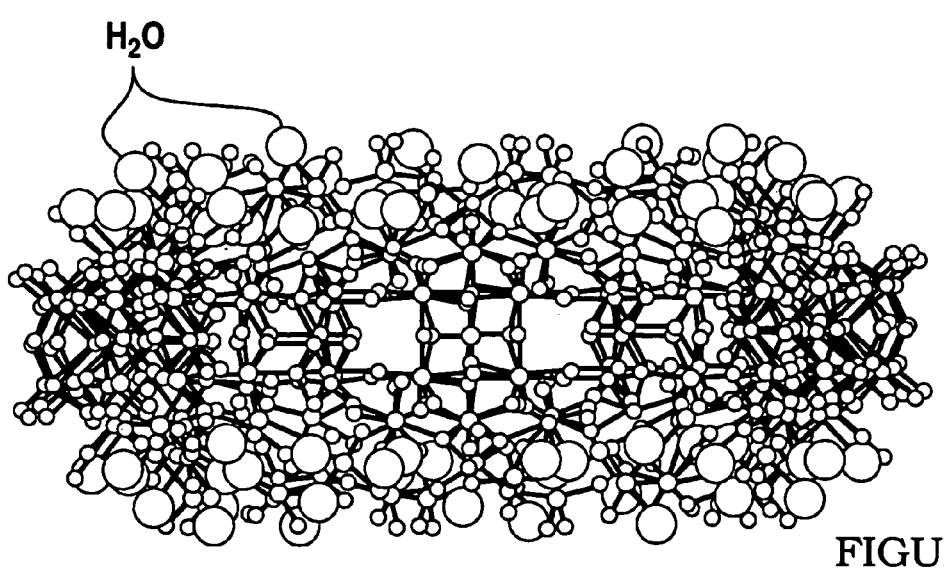
FIG. 1b is a side view of an oxo-anion in a ring-like configuration, in accordance with one embodiment of the present invention.

Preferably, these oxo-anions are configured in a ring-like structure when in an aqueous solution, as the exemplary Mo-blue anion is depicted in FIGS. 1a-1b. The water molecules are depicted as spheres in these views. Thus, these aqueous oxo-anions would have the general formula $(A_NO_N)_N(H_2O)_N$, wherein A is molybdenum, phosphorous, tungsten, and/or silicon, O is oxygen, H is hydrogen, and N is an integer equal to 1 or greater. These types of oxo-anions are referred to as supramolecular oxo-anions.

Supramolecules are generally defined as relatively large molecules comprised of individual subunits wherein each subunit is capable of performing a specific function. The subunits are bound together reversibly by intermolecular forces, rather than by conventional covalent bonds (i.e., shared electrons).

In accordance with one embodiment of the present invention, these supramolecular oxo-anions are preferably incorporated into water soluble polymeric oxidic acids having the general formula $(H_NA_NO_N)_N(A_NO_N)_N(H_2O)_N$, wherein H is hydrogen, O is oxygen, N is an integer equal to 1 or higher, and A is selected from the group consisting of molybdenum, phosphorous, tungsten, silicon, and combination thereof. The acid portion of the polymer, $(H_NA_NO_N)_N$, is referred to as an oxidic acid because it contains oxygen. The polymer itself is also a type of oxo-anion, as it contains oxygen and preferably has a net negative ionic charge.

Preferably, the oxidic acid portion and the oxo-anion portion do not contain the same exact element selected from the group consisting of molybdenum, phosphorous, tungsten, or silicon. As non-limiting examples, if the oxidic acid contains molybdenum then the oxo-anion contains either phosphorous, tungsten, or silicon, if the oxidic acid contains phosphorous then the oxo-anion contains either molybdenum, tungsten, or silicon, if the oxidic acid contains tungsten then the oxo-anion contains either molybdenum, phosphorous, or silicon, and if the oxidic acid contains silicon then the oxo-anion contains either molybdenum, phosphorous, or tungsten.

The oxo-anions and the water soluble polymeric oxidic acids containing them have corrosion inhibiting properties, especially against pit corrosion on aluminum and aluminum alloys. The oxo-anions and the water soluble polymeric oxidic acids may be used without the need for specific counter-ions (e.g., cations) in high moisture environments, such as water processing systems, radiators, and the like, where pitting corrosion commonly occurs. The oxo-anions and the water soluble polymeric oxidic acids would simply be combined with water to form an aqueous solution and then applied to the surfaces of the aluminum and aluminum alloys, whether coated (e.g., painted or anodized) or not, so as to impart a sufficient amount of protection against the propagation of pit corrosion.

In accordance with another embodiment of the present invention, the water soluble polymeric oxidic acids are reacted with cations, preferably metallic, to form metallic salts of the supramolecular oxo-anions. These salts are also preferably capable of substantially inhibiting the propagation of pit corrosion on the surface of a coated (e.g., anodized or painted) metallic substrate (e.g., aluminum and aluminum alloys).

Without being bound to a particular theory of the operation of the present invention, it is believed that the metallic salts of the supramolecular oxo-anions of the present invention (1) adsorb onto aluminum oxide coatings so as to lower the zeta potential of the oxide so as to discourage the adsorption of corrosive halide ions; (2) remain immobilized in the protective coating (i.e., paint or oxide) until needed to inhibit corrosion; (3) release corrosion inhibiting species upon exposure to a corrosive aqueous environment; and (4) reinforce the growth of a protective aluminum oxide film, or inhibit cathodic reduction of oxygen on cathodically active sites such as secondary phase compounds.

These metallic cations preferably have the general formula $D_N$, wherein D is a metal, and N is an integer equal to 1 or higher. Preferably, these metallic cations are independently capable of substantially inhibiting the propagation of pit corrosion on the surface of a coated (e.g., anodized or painted) metallic substrate, such as aluminum and aluminum alloys.

The metallic cations preferably include transition metals, alkaline earth metals, rare earth metals, and metals from Groups XIII-XV of the periodic table of elements.

Preferred transition metals include, but are not limited to zinc, tungsten, scandium, and yttrium. Preferred alkaline earth metals include, but are not limited to strontium and barium. Preferred rare earth metals include, but are not limited to the lanthanide series of the periodic table of elements, including, but not limited to lanthanum, cerium, praseodymium, neodymium, promethium, samarium, europium, gadolinium, terbium, dysprosium, holmium, erbium, thulium, ytterbium, and lutetium.

Preferably, the metallic salts of the supramolecular oxo-anions have the general formula $(D_N)(((H_NA_NO_N)_N(A_NO_N)_N(H_2O)_N)_N)$; wherein D is a metal cation, H is hydrogen, O is oxygen, N is an integer equal to 1 or higher, and A is selected from the group consisting of molybdenum, phosphorous, tungsten, silicon, and combination thereof. The use of these metallic salts of the supramolecular anions of oxo-Mo, oxo-W, OXO-P, and Oxo-Si or combinations thereof would provide a surface active source of chemical species that inhibit the propagation of localized corrosion of aluminum and aluminum alloys and stabilize their passivation and/or anodized oxide coatings.

Figure 2:
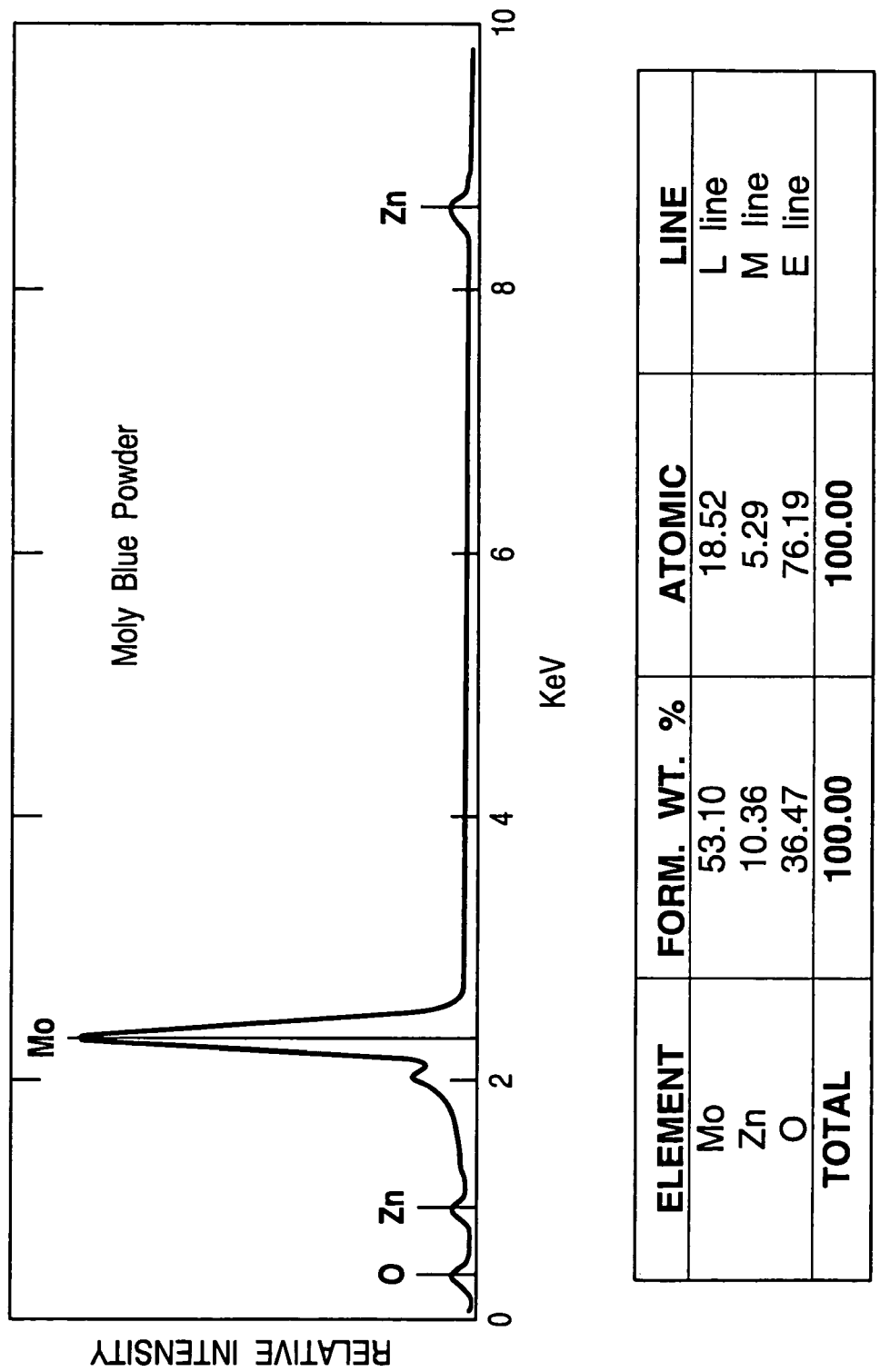
FIG. 2 is a graphical view of an energy dispersive x-ray spectrum (EDAX) of an exemplary metallic salt of a supramolecular oxo-anion, in accordance with one embodiment of the present invention.
Figure 3:
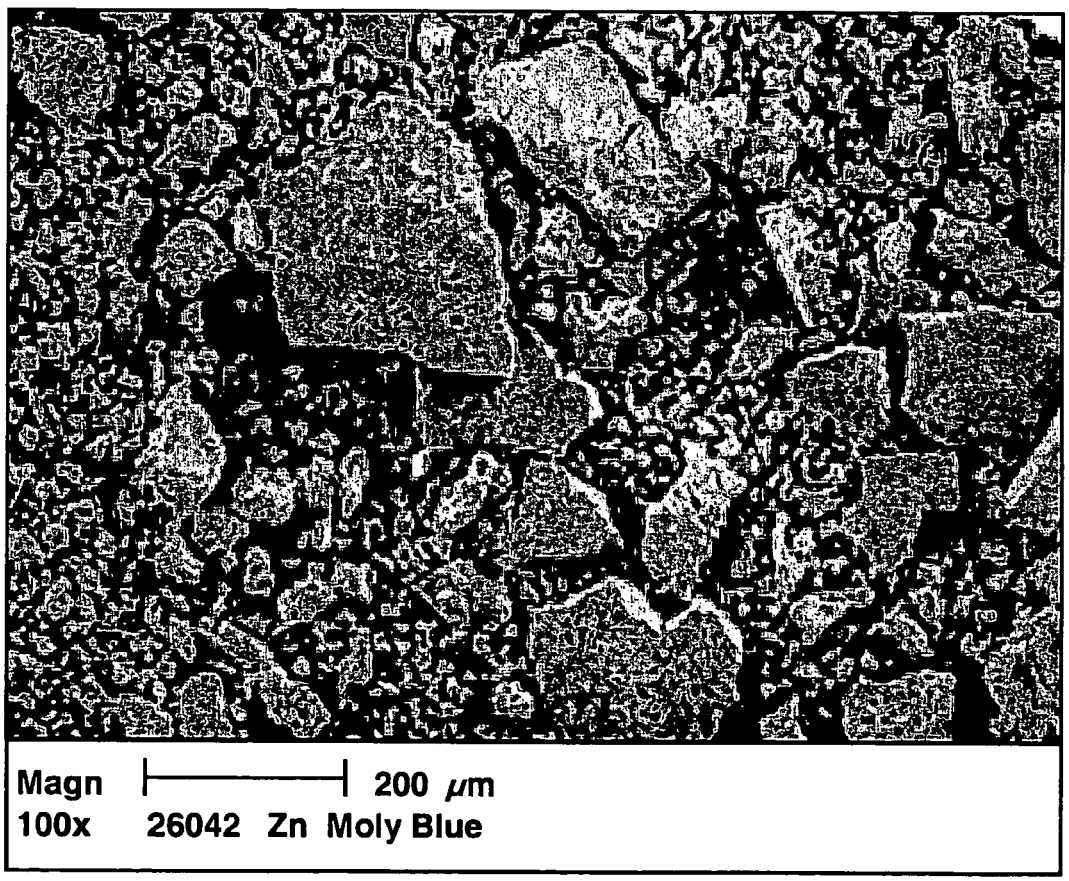
FIG. 3 is a photographic view of a scanning electron microscope (SEM) photograph of the exemplary metallic salt of a supramolecular oxo-anion shown in FIG. 2, in accordance with one embodiment of the present invention.

By way of a non-limiting example, zinc cation reacts with a solution of $(H_3PO_4)(12MoO_3 \times H_2O)$ to form a deep blue, water soluble salt having the probable composition of $Zn_{21}((Mo_{154}O_{462}(H_2O)_{54}(H_2PO_2)_7) \times NH_2O)_2$, wherein N is an equal to 1 or greater. An energy dispersive x-ray spectrum (EDAX) graph and scanning electron microscope (SEM) photograph of the exemplary $Zn_{21}((Mo_{154}O_{462}(H_2O)_{54}(H_2PO_2)_7) \times NH_2O)_2$ composition are shown in FIGS. 2-3.

These the metallic salts of the supramolecular oxo-anions are water soluble making them very easy to process, but will also adsorb onto the surfaces of corrosion inhibiting pigments, such as wollostonite (i.e., calcium silicate), zinc phosphate, barium metaborate, or inert oxide pigments, such as silica, titania, and talc. While the metallic salts of the supramolecular oxo-anions are water soluble in their own right, as surface adsorbates they become sparingly soluble as a result of their ability to adsorb.

Figure 4:
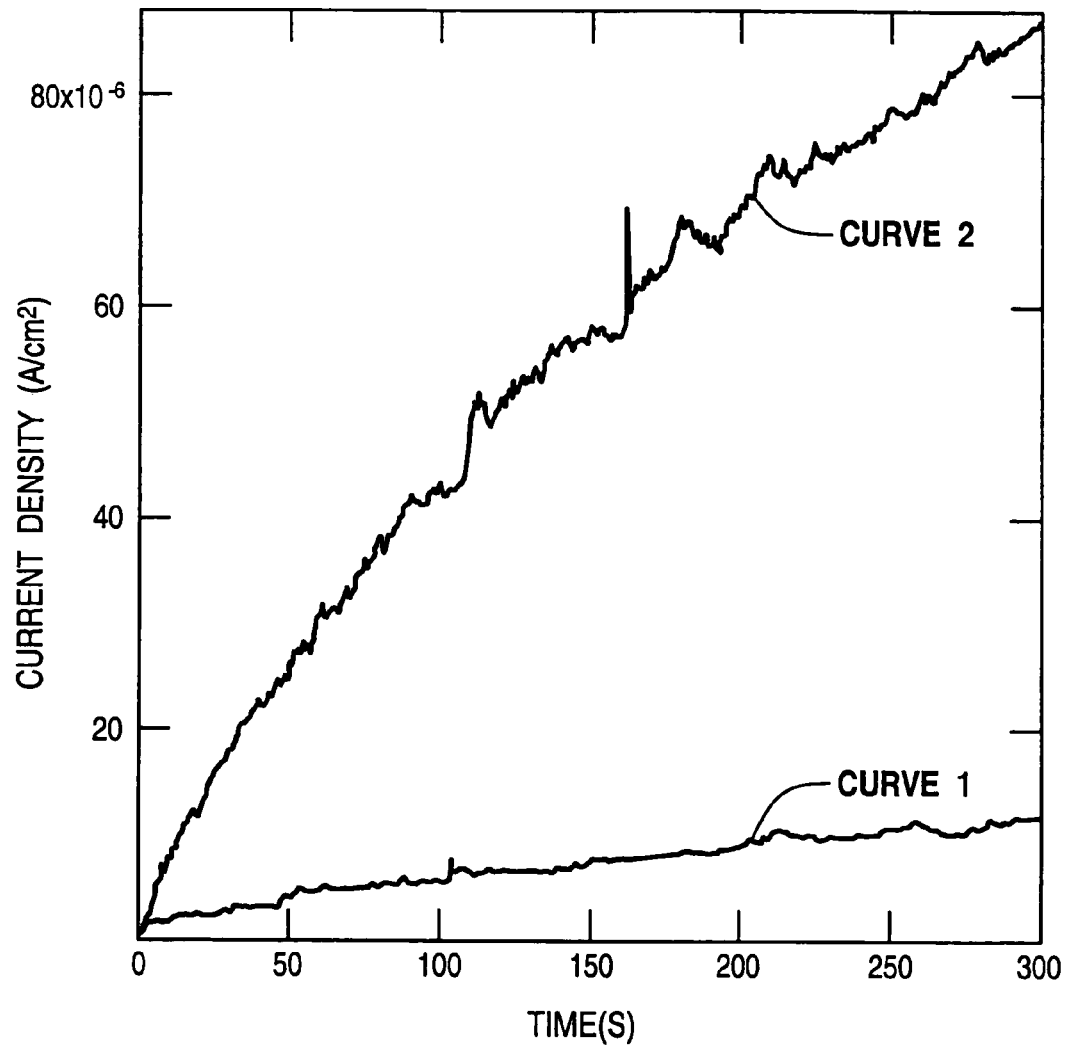
FIG. 4 is a graphical view of a potentiostatic current density vs. time plot for two aluminum-containing samples in a corrosive solution, one corrosive solution contains a corrosion-inhibiting agent and the other contains no corrosion-inhibiting agent, in accordance with one embodiment of the present invention.

While it does not presently appear that these salts inhibit the initiation of corrosion on bare (i.e., uncoated) aluminum and aluminum alloys, they have been observed to slow the rate of pit propagation of these substrates as shown in FIG. 4.

Referring to FIG. 4, the current represents the rate of pit propagation for the respective sample. Curve 1 is the current vs. time curve for Al 2024-T3 in 0.01 M NaCl plus 0.1 vol. % of a metallic salt of a supramolecular oxo-anion, which contains, among other things, Zn, Mo, O, P, and having the nominal composition of $Zn_{21}((Mo_{154}O_{462}(H_2O)_{54}(H_2PO_2)_7) \times NH_2O)_2$, wherein N is an integer equal to 1 or higher. Curve 2 is the current vs. time curve for Al 2024-T3 polarized at −350 mV vs. SCE in 0.01 M NaCl (i.e., saltwater). As can be seen, the current in the presence of the corrosion-inhibiting metallic salt of the supramolecular oxo-anion is substantially less than that for the alloy in the presence of the 0.01 M NaCl containing no corrosion-inhibiting agent.

By way of a non-limiting example, these metallic salts of supramolecular oxo-anions are envisioned to adsorb onto porous anodized aluminum or aluminum coated with a protective hydrotalcite. For example, the supramolecular phospho-molybdate anion, when adsorbed, would be expected to lower the zeta potential of the oxide coating so as to discourage the adsorption of corrosive halide ions.

Gradual release of the adsorbed metallic salts of supramolecular oxo-anions over time, in the presence of an aqueous corrosive agent, would result in the inhibition of any localized corrosion such as pitting, stress corrosion cracking, corrosion fatigue, and exfoliation.

In addition to the oxo-anions, the counter-ions (i.e., cations) such as Zn, Ba, and Ce also provide a source of materials known to inhibit corrosion of aluminum and aluminum alloys by forming precipitates at cathodically active sites.

The metallic salts of supramolecular oxo-anions can also be used as dopants for protective sol-gel coatings. Provided that they retain the ring-like anionic structures in the sol-gel coatings, they would then provide sites for selectively exchanging specific molecules that could serve specific functions such as corrosion inhibition, catalysis, sensing, phosphorescence, and fluorescence.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

The invention claimed is:

1. A method of inhibiting corrosion on a metal substrate with a material comprising:
preparing a metal substrate;
placing a corrosion inhibitor near the metal substrate to inhibit corrosion of said metal substrate;
wherein the corrosion inhibitor includes:
a supramolecular oxo-anion having the general formula $(H_NA_NO_N)_N(A_NO_N)_N(H_2O)_N$;
wherein H is hydrogen, O is oxygen, N is an integer equal to 1 or higher, and A is selected from the group consisting of molybdenum, phosphorous, tungsten, silicon, and combination thereof;
wherein said corrosion inhibitor is operable to inhibit corrosion relative to said metal substrate.

2. The method claim 1, wherein preparing a metal substrate includes forming a component including an aluminum alloy.

3. The method of claim 1, wherein preparing a metal substrate includes painting said metal substrate with a material to form a first coating on said metal substrate.

4. The method of claim 1, wherein placing a corrosion inhibitor relative to said substrate includes at least one of spraying said corrosion inhibitor relative to said substrate, dipping said metal substrate in said corrosion inhibitor, brushing said corrosion inhibitor on said metal substrates, absorbing said corrosion inhibitor into said metal substrate, or combinations thereof.

5. The method of claim 1, wherein the corrosion inhibitor further includes a cation operable to substantially inhibit propagation of a pit corrosion in said metal substrate.

6. The method of claim 5, wherein said cation is selected from a group comprising a transition metal, an alkaline earth metal, a rare earth metal, a lanthanide series element, or combination thereof.

7. The method of claim 5, wherein said oxo-anion and said cation form a salt operable to substantially inhibit corrosion.

8. The method of claim 7, further comprising absorbing said salt into said metal substrate.

9. The method of claim 1, further comprising absorbing said supramolecule into said metal substrate.

10. The method of claim 1, further comprising forming the supramolecule in an aqueous solution to substantially form the material to form said corrosion inhibitor.

11. The method of claim 1, wherein forming a corrosion inhibitor further includes forming a salt of a cation and said oxo-anion.

12. The method of claim 11, wherein said salt has a general formula of $(D_N)(((H_N A_N O_N)_N(A_N O_N)_N(H_2O)_N)_N)$;
wherein D is a metal cation.

13. The method of claim 1, further comprising:
forming a polymer of said oxo-anion;
wherein said polymer is operable to allow release of said oxo-anion to substantially inhibit corrosion of said substrate.

14. The method of claim 13, wherein said polymer releases said oxo-anion in a moisture rich environment.

15. The method of claim 1, further comprising: forming a mixture effective to inhibit corrosion when applied to the prepared metal substrate.

16. A method of inhibiting corrosion on a metal substrate with a material, comprising:
providing a metal substrate;
providing a metallic salt of a supramolecular oxo-anion having the general formula $(D_N)(((H_N A_N O_N)_N(A_N O_N)_N(H_2O)_N)_N)$;
wherein D is a metal cation, H is hydrogen, 0 is oxygen, N is an integer equal to 1 or higher, and A is selected from the group consisting of molybdenum, phosphorous, tungsten, silicon, and combination thereof;
placing the salt on the metal substrate and inhibiting the propagation of pit corrosion on the surface of the metal substrate.

17. The method of claim 16, wherein D is a transition metal.

18. The method of claim 16, wherein D is an alkaline earth metal.

19. The method of claim 16, wherein D is a rare earth metal.

20. The method of claim 16, wherein D is an element selected from the lanthanide series of the periodic table of elements.

21. The method of claim 16, wherein D is selected from the group consisting of barium, strontium, aluminum, zinc, lanthanum, cerium, praseodymium, neodymium, promethium, samarium, europium, gadolinium, terbium, dysprosium, holmium, erbium, thulium, ytterbium, lutetium, yttrium, scandium, and combinations thereof.

22. The method of claim 16, wherein the metal substrate is comprised of a material selected from the group consisting of aluminum, aluminum alloys, and combinations thereof.

23. The method of claim 16, wherein the placing includes coating of the metal substrate comprised of a material selected from the group consisting of oxides, pigments, and combinations thereof.

* * * * *